United States Patent [19]
Ohyama et al.

[11] Patent Number: 5,510,941
[45] Date of Patent: Apr. 23, 1996

[54] MAGNETO-RESISTIVE TYPE MAGNETIC HEAD WITH A SHUNT LAYER OF MOLYBDENUM

[75] Inventors: Tatsushi Ohyama, Kadoma; Masahiro Nakata, Osaka; Naoto Matono, Kadoma, all of Japan

[73] Assignee: Sanyo Electric Co., Ltd., Osaka, Japan

[21] Appl. No.: 227,277

[22] Filed: Apr. 13, 1994

[30] Foreign Application Priority Data

Apr. 14, 1993 [JP] Japan .................................. 5-087373
Dec. 21, 1993 [JP] Japan .................................. 5-322170

[51] Int. Cl.$^6$ .................................................. G11B 5/39
[52] U.S. Cl. ................................................................ 360/113
[58] Field of Search ............................... 360/113, 122; 338/32 R; 324/252

[56] References Cited

U.S. PATENT DOCUMENTS

| | | | |
|---|---|---|---|
| 4,663,684 | 5/1987 | Kamo et al. | 360/113 |
| 4,802,043 | 1/1989 | Sato et al. | 360/113 |
| 4,807,073 | 2/1989 | Takeura et al. | 360/113 |
| 4,841,399 | 6/1989 | Kitada et al. | 360/113 |
| 5,010,433 | 4/1991 | Kitada et al. | 360/113 |
| 5,212,609 | 5/1993 | Yuito et al. | 360/113 |
| 5,327,313 | 7/1994 | Nishioka et al. | 360/113 |
| 5,337,203 | 8/1994 | Kitada et al. | 360/113 |

FOREIGN PATENT DOCUMENTS

| | | |
|---|---|---|
| 49-074523 | 7/1974 | Japan . |
| 62-128015 | 6/1987 | Japan . |
| 01217719 | 8/1989 | Japan . |

OTHER PUBLICATIONS

Oikawa and Amazawa, "Physical Properties of Vacuum Deposited Mo Films," Applied Physics, vol. 47, No. 3, 1976.

*Primary Examiner*—John H. Wolff
*Assistant Examiner*—Brian E. Miller
*Attorney, Agent, or Firm*—Loeb and Loeb

[57] ABSTRACT

A magneto-resistive head has an upper shield layer, a lower shield layer spaced a distance from the upper shield layer, a magneto-resistive layer disposed over the lower shield layer, a shunt layer disposed adjacent to the magneto-resistive layer for giving a magnetic bias field to the magneto-resistive layer, and a electrode layer in contact with the magneto-resistance device and the shunt layer for providing an electric current to both of the magneto-resistive layer and the shunt layer electric current. The magneto-resistive layer, the shunt layer and the electrode layer are disposed between the upper shield and the lower shield. The shunt layer consist of molybdenum having a grain size more than 150 angstrom. The shunt layer has low specific resistance. Therefore, the thickness of the shunt layer can be reduced. As a result, the distance between the upper and lower shield layer can be reduced. Consequently, the gap length of the magneto-resistive head is narrower than prior art magnetic heads.

18 Claims, 15 Drawing Sheets

MAGNETO-RESISTIVE TYPE MAGNETIC HEAD WITH A SHUNT LAYER OF MOLYBDENUM

FIELD OF THE INVENTION

The present invention relates to a magneto-resistive head with a shunt layer. More particularly, the present invention relates to a magneto-resistive head with a shunt layer having a substantially reduced gap length and having good heat resistance and good corrosion resistance.

BACKGROUND OF THE INVENTION

A magneto-resistive head (hereinafter MR head) is used in a hard disk drive of a computer or a signal recording and reproducing apparatus, such as, for example, a video tape recorder. The MR head has good characteristics for reproducing a signal.

The MR head is a magnetic head using a magneto-resistive layer (hereinafter MR device). The MR device has characteristics in which the electric resistance thereof changes in accordance with a magnetic field adjacent to the MR device. Therefore, as the magnetic field adjacent to the MR device in the MR head changes in response to a signal recorded on a magnetic medium, the MR head provides a reproducing signal which is proportional to the resistance change of the MR device.

In the MR head, the reproducing signal is proportional only to the resistance change. In other words, the amplitude of the reproducing signal is proportional to the strength of the magnetic field adjacent to the MR head. As a result, the amplitude of the reproducing signal has no relation to the relative speed between the MR head and the magnetic medium. Further, the reproduction sensitivity of the MR head is greater than that of the ordinary magnetic head.

The MR head has nonlinear characteristics between the resistance change and the strength of magnetic field. To provide a reproducing signal proportional to the strength of the magnetic field from the MR head, it is necessary to provide a predetermined magnetic bias field to the MR device. For a device used to provide the magnetic bias field, it is preferable to dispose a shunt layer adjacent to the MR device, such as described in U.S. Pat. No. 5,010,433. The shunt layer is a electric current path disposed adjacent to the MR device. The electric current through the shunt layer provides the magnetic bias field.

In a prior arrangement shown in FIG. 15, an MR device 2 of 400 angstrom (Å) thickness is formed on a glass substrate 1. A shunt layer 3 (a zirconium thin film 1500 angstrom (Å) thick) is disposed on the MR device 2. Further, an aluminum electrode 4 and a protective $SiO_2$ layer 5 are formed on the shunt layer 3.

Potential difference across the electrodes 4 causes an electric current to flow through the MR device 2 and the shunt layer 3. The current flowing through the shunt layer 3 produces a magnetic bias field to the MR device 2. Because of the magnetic bias field, the MR head provides a reproducing signal proportional to the strength of the magnetic field from a magnetic medium, such as, for example, a video tape.

Titanium (Ti), tantalum (Ta), molybdenum (Mo), gold (Au), niobium (Nb), zirconium (Zr), etc. have been used for the shunt layer in a conventional shunt bias MR head. A shunt layer of Ti, Au and Zr has a problem in that the material of the shunt layer and the MR device react with each other and result in the deterioration of the signal reproducing characteristics of the MR device. Mo is also unsuitable due to its extremely poor corrosion resistance.

A shunt layer having high electrical resistivity requires a thick shunt layer to provide a predetermined strength of magnetic bias field to the MR device. It is desirable for the shunt layer and the MR device to be narrow so that the MR head can reproduce high frequency signals.

SUMMARY OF THE INVENTION

An object of embodiments of the present invention is to provide a magneto-resistive head with a shunt layer of a substantially reduced gap length of the magnetic head.

Another object of embodiments of the present invention is to provide a magneto-resistive head having good corrosion resistance and less reaction with the magneto-resistance (MR) device.

In accordance with these and other objects of the present invention, a magneto-resistive head comprises an upper shield layer, a lower shield layer, a magneto-resistive layer, a shunt layer for providing a magnetic bias field to the magneto-resistive layer and an electrode layer for providing electric current to both the magneto-resistive layer and the shunt layer. The magneto-resistive layer, the shunt layer and the electrode layer are disposed between the upper shield and the lower shield. The shunt layer illustratively consists of molybdenum having a grain size greater than approximately 150 angstrom (Å).

From experimental research by the inventors, the molybdenum layer having a grain size more than 150 angstrom (Å) has a low specific resistance, even for a thin layer, such as, for example, 100 angstrom. For given shunt layer of a given area and resistance, a shunt layer using a material having a lower specific resistance allows the thickness of the shunt layer to be reduced. In other words, when a shunt layer uses molybdenum having mean grain size more than 150 angstrom, the thickness of the shunt layer may be made substantially small. However, the amount of electric current through the shunt layer can be maintained at the same level. As a result, the strength of the magnetic bias field generated by the current flowing through the shunt layer does not change.

Because the shunt layer in one embodiment of the present invention is narrower, the distance between the upper shield and the lower shield is reduced. This is because the shunt layer is located between the upper and lower shield. A gap length of the magnetic head for the MR head which has an upper and a lower shield layer is defined by the distance between the upper and lower shields. The present invention provides an MR head having a narrow gap length.

Further, from the experimental research by the inventors, a molybdenum layer having a mean grain size more than 150 angstrom has good corrosion resistance and less reaction between the shunt layer and the MR device.

DETAILED DESCRIPTION OF THE PREFERRED EMBODIMENTS

Figure 1:
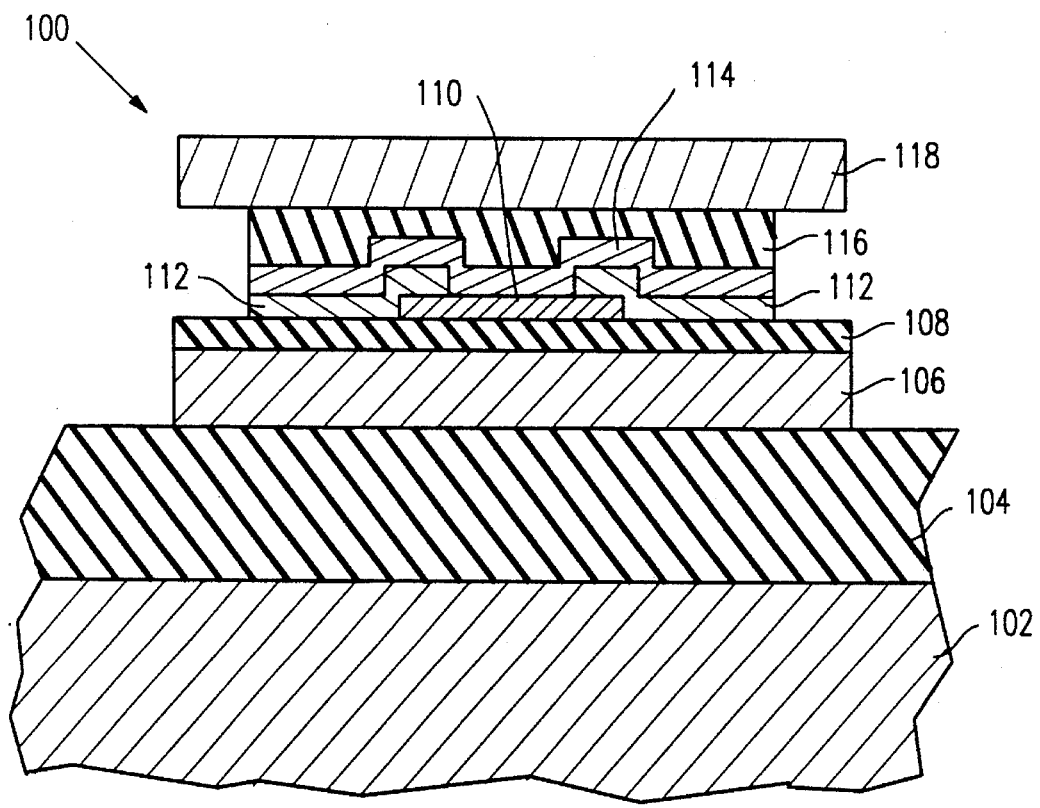
FIG. 1 is a cross section view showing a first embodiment of the present invention.
Figure 2:
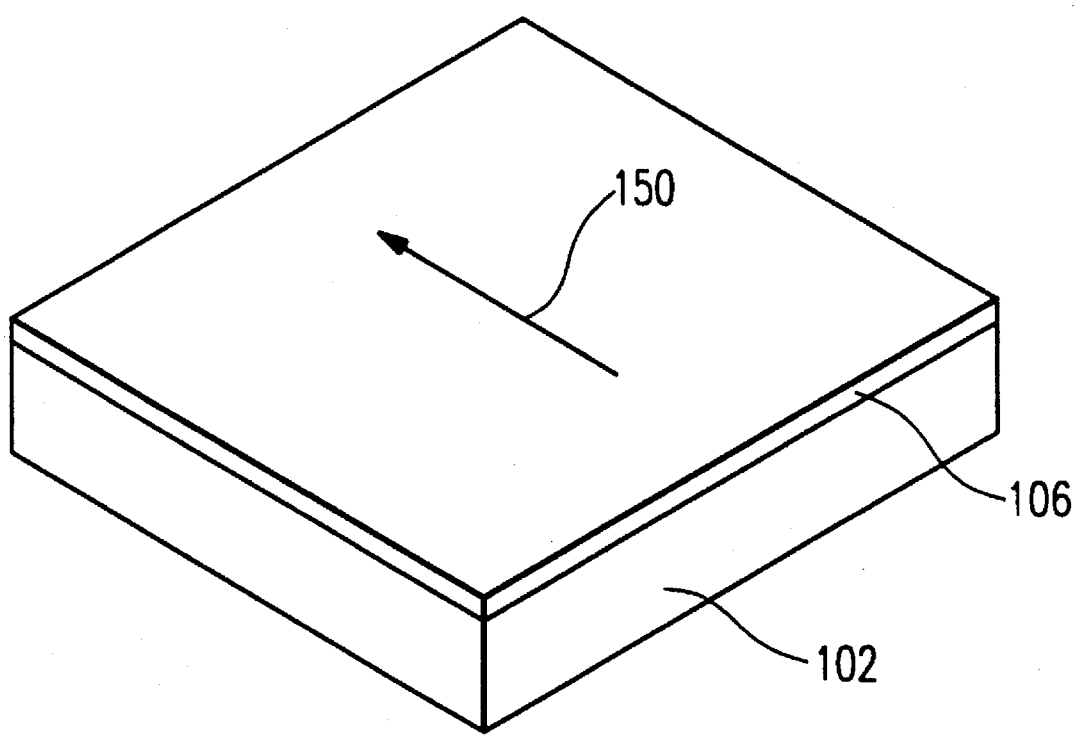
FIG. 2 is a perspective view showing a first step of a manufacturing process used to fabricate the first embodiment of the present invention.

FIG. 1 shows the structure of a first embodiment of the present invention from a cross sectional view. The MR head 100 includes a base 102 illustratively made of $Al_2O_3$—TiC, an insulation layer 104 illustratively made of $Al_2O_3$, a lower shield layer 106 made of, for example, NiFe, a lower insulation layer 108, an MR layer 110 made of NiFe, electrode layers 112, each of which is composed of layers of Molybdenum (Mo), Gold (Au) and Mo, a shunt layer 114 made of Mo, an upper insulation layer 116 and an upper shield layer 118.

The shunt layer 114 has a thickness on the order of 100 angstrom (Å). Further, the grain size of the Mo that forms the shunt layer 114 is preferably more than 150 angstrom (Å). The term "grain size" as used herein means an average grain size (D) along a direction in a plane of the shunt layer 114. The average grain size (D) may preferably be measured by a method in which a line width of diffraction in plane(1 1 1) by X-ray is measured. This value is applied to Scherrer's formula, as shown below.

$$D = \frac{(0.94 \times \lambda)}{(B-b) \times \cos\theta}$$

wherein k is a wavelength of X-ray, θ is a Bragg angle, B is a half value of a measured diffraction line width and b is a distribution of X-ray of the diffraction apparatus.

The specific resistance value of the shunt layer 114 is illustratively 20 μΩcm. This value of the specific resistance is substantially low in comparison with that used in prior art. A relatively low specific resistance facilitates in making the thickness of the shunt layer 114 smaller without changing the resistance of the shunt layer 114. A gap length of the MR head 100 is defined by the distance between the upper shield layer 118 and the lower shield layer 108. Since the shunt layer 114 is disposed between the upper shield layer 118 and the lower shield layer, the thickness of the shunt layer 114 effects the gap length of the MR head 100. In other words, if the thickness of the shunt layer 114 is made smaller, the gap length of the MR head 100 is also made smaller. Therefore, using a material having a relatively low specific resistance as the shunt layer is preferable for making the MR head to have a narrow gap length.

Potential difference applied across the electrodes 112 causes an electric current to flow through the MR layer 110 and the shunt layer 114. When considering an electric current path, the MR layer 110 and the shunt layer 114 comprise a parallel circuit. Therefore, the electric current from the electrodes 112 is divided between the MR layer 110 and the shunt layer 114 according to the respective resistivity of the MR layer 110 and the shunt layer 114. In other words, when the electric current through the electrode 112 is constant, if the resistance of the shunt layer 114 is reduced (because of using a material having relatively low specific resistance), the amount of the current through the shunt layer 114 is increased. Further, the amount of the electric current through the MR layer 110 is decreased.

The amount of the electric current through the MR layer 110 affects an output signal from the MR head. The output voltage of the MR head 100 is proportional to the product of the amount of the electric current through the MR layer 110 and the resistance of the MR layer 110. On the other hand, the amount of the electric current through the shunt layer 114 affects the strength of the magnetic bias field generated by the shunt layer 114.

The amount of the electric current provided from the electrode layers 112 should not become large, because of heat generation from the MR head 100. Therefore, it is important to maximize the output signal at a predetermined amount of electric current provided from the electrode layers 112. To achieve this purpose, it is necessary that a small amount of electric current through the shunt layer provide a strong enough magnetic bias field to the MR layer 110 to achieve preferable characteristics for the MR head.

Figure 14:
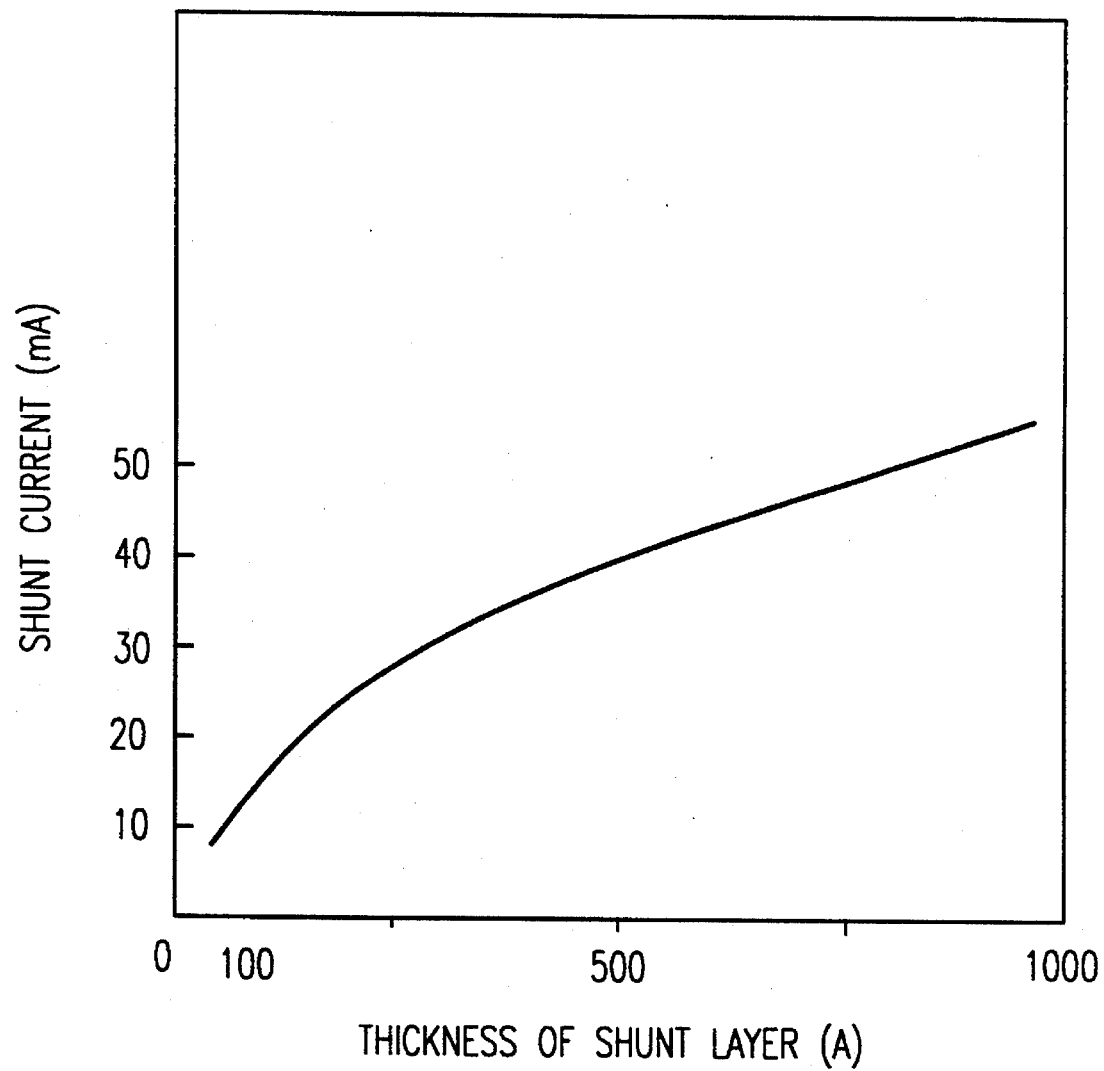
FIG. 14 is a graph view showing the relation between the thickness of a shunt layer and the electrical current in the shunt layer for providing a predetermined magnetic bias field.
Figure 15:
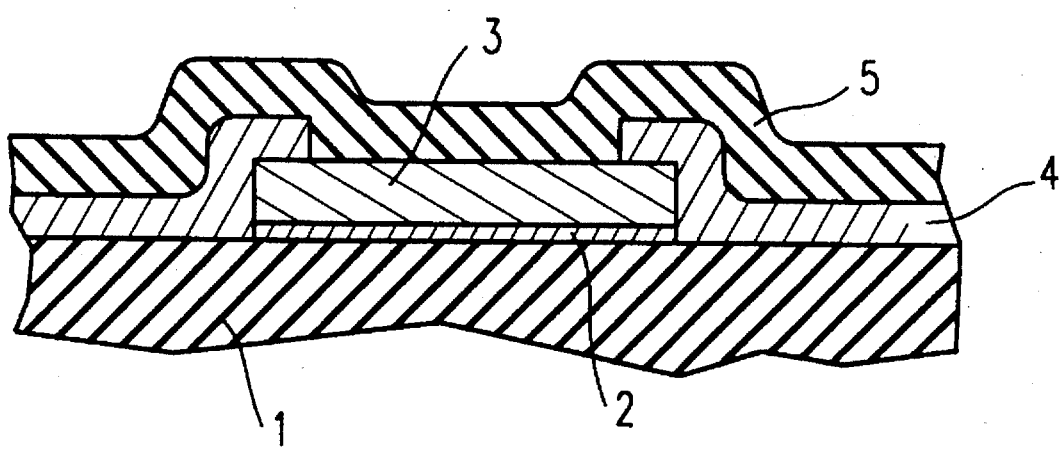
FIG. 15 is a cross-sectional view of a prior art magneto-resistance type magnetic head.

FIG. 14 shows a relation between the thickness of a shunt layer and the electrical current in the shunt layer necessary for providing a predetermined strength of magnetic bias field. FIG. 14 was obtained by a simulation. In the simulation, the predetermined strength is about 75 oersted (Oe). FIG. 14 shows that if the thickness of the shunt layer is smaller than 100 angstrom, the needed amount of the electric current through the shunt layer is rapidly decreased. This means that the smaller the thickness of the shunt layer, the smaller the necessary amount of current for providing the predetermined strength of the magnetic bias field.

Use of a material having a low specific resistance in the shunt layer reduces the thickness of the shunt layer. Therefore, use of a material having a low specific resistance not only reduces the gap length of the MR head but also reduces the necessary amount of electric current for providing the predetermined strength of the magnetic bias field.

FIG. 2 to FIG. 5 show a manufacturing process of one embodiment of the present invention. First, the insulator layer 104 (not shown in FIG. 2 and 3) is formed on the base 102 by a sputtering method. The base 102 is made of $Al_2O_3$—TiC and has a thickness of approximately 2.6 mm. The insulator layer 104 has a thickness of from 10 μm to 15 μm. Further, the insulator layer 104 is made of $Al_2O_3$.

The lower shield layer 106 of NiFe is formed by a bias-sputtering method on the insulator layer 104 (not shown). The thickness of the lower shield layer 106 is 1 μm. The bias-sputtering method is a sputtering method under an electrical bias. Preferably, good soft magnetic characteristics may be added to the lower shield layer 106 to provide negative bias, for example, minus 100 volts. Further, in the process of the bias-sputtering, a magnetic field in a direction 150 is provided to the base 102. The magnetic field is provided by magnets on a base holder(not shown). The strength of the magnetic field is, for example, 100 oersted (Oe). Because of the magnetic field, the lower shield layer 106 has magnetic anisotropic characteristics.

After forming the lower shield layer 106, the lower shield layer 106 is formed to a predetermined shape by a photo lithography technique, for example, an ion milling method. In the process of shaping the lower shield layer 106, it is important to match the direction of the magnetic anisotropic characteristics and the shape of the lower shield layer 106.

After forming the shape of the lower shield layer 106, the lower insulator layer 108 is formed on the lower shield layer 106 by sputtering. The lower insulator layer 108 is not shown in FIG. 2. The lower insulator layer 108 (of $Al_2O_3$) has a thickness of 2500 angstrom (Å).

Figure 3:
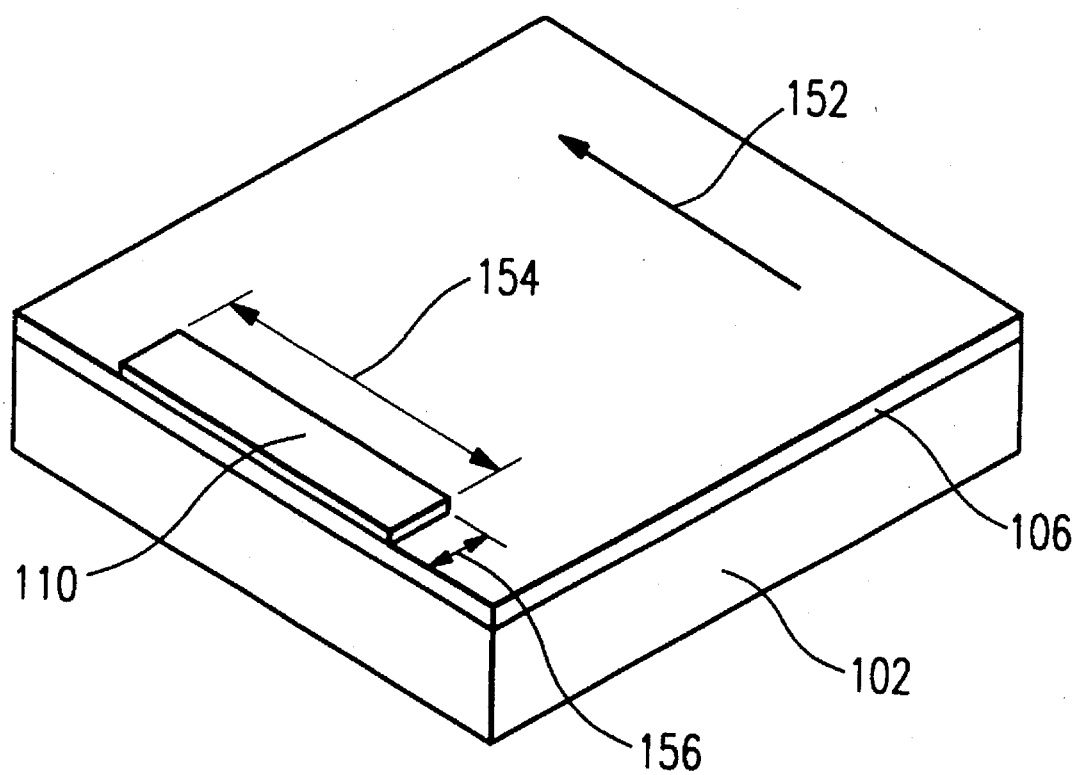
FIG. 3 is a perspective view showing a second step of the manufacturing process.

Next, in FIG. 3, the MR layer 110 made of an NiFe film is formed on the lower insulator layer 108 by sputtering. The MR layer 110 contains 81 weight (wt) % of Ni and 19 wt % of Fe. Further, the thickness of the MR layer 110 is 300 angstrom (Å). The temperature of the base 100 is maintained at 200° C., during the sputtering. A magnetic field in a direction 152 is also provided to the base 100. The strength of the magnetic field is 100 Oe. Because of the magnetic field, the magnetization vector within the MR layer 110 is aligned in the direction 152 of the applied magnetic field. Further, the MR layer 110 is formed to a predetermined shape by a photo lithography technique, for example, an ion milling method. The longitudinal direction of the MR layer 110 coincides with the magnetization vector. In this embodiment, the length of a long side 154 is 100 μm and the length of a short side 156 is 5 μm.

Figure 4:
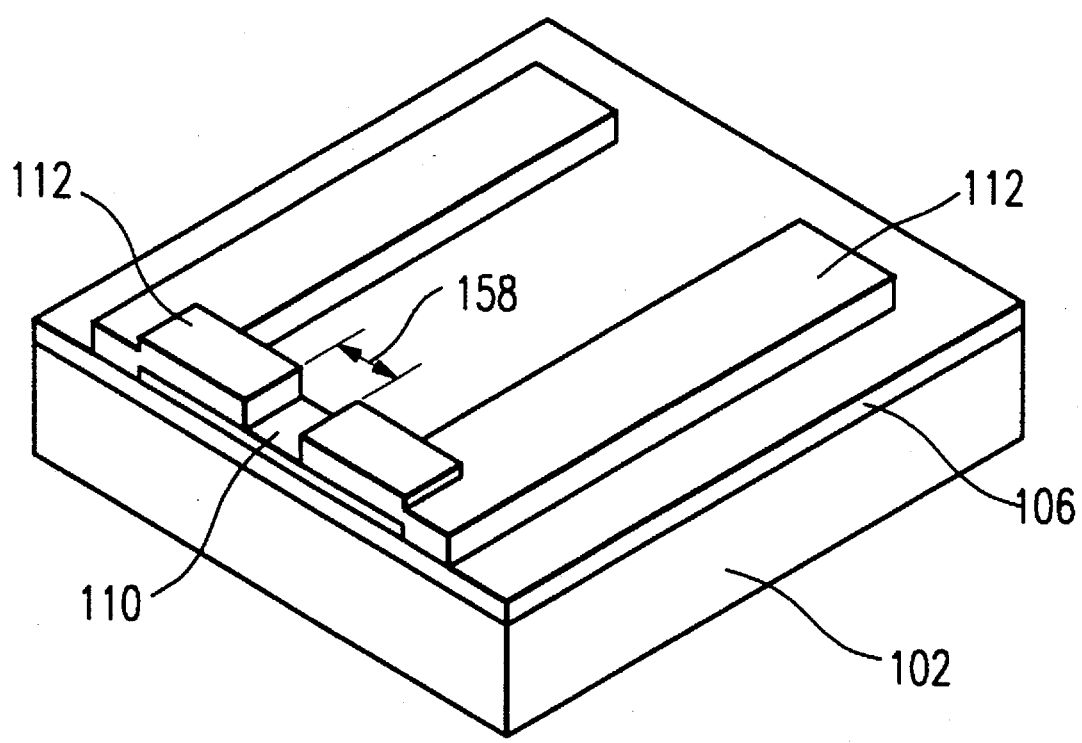
FIG. 4 is a perspective view showing a third step of the manufacturing process.

Next, as shown in FIG. 4, the electrode layers 112 are formed on the MR layer 110. The electrode layers 112 each contain three layers, an upper layer of Mo (200 angstrom (Å)), a middle layer of Au (1200 angstrom (Å)) and a lower layer of Mo (100 angstrom (Å)). These three layers are formed by sputtering. After forming the electrode layers 112. These electrode layers 112 are shaped by a photo lithography technique, for example, an ion milling method. The electrode layers 112 are separated about 5 μm from each other about the center part of the MR layer 110. This distance 158 defines a track width of the MR head 100.

Figure 5:
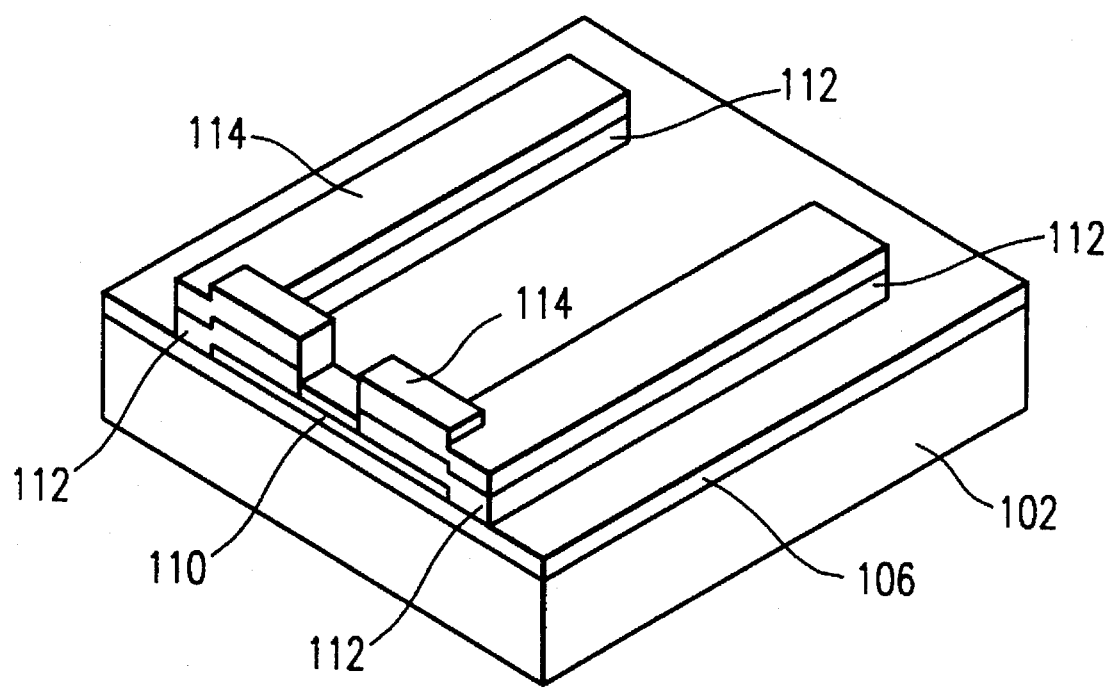
FIG. 5 is a perspective view showing a fourth step of the manufacturing process.

Next, in FIG. 5, a thin film of Mo is formed on the MR layer 110 by sputtering. The thin film has a thickness of 150 angstrom (A). Further, the thin film is shaped by a photo lithography technique, for example, a ion milling method. As a result, the shunt layer 114 is formed. The shunt layer 114 is formed on the electrode layers 112. Further, on the center part of the MR layer 110, at which the electrode layers 112 are not formed, the shunt layer 114 directly contacts the MR layer 110. The shunt layer 114 is formed under the following conditions: the temperature of the base 100 is maintained at 200° C., a pressure of 2 mTorr is used for argon gas and the power for making the electric field of the sputtering process is 160 Watt. The air pressure before pouring of the argon gas, i.e., a degree of vacuum, is $7 \times 10^{-7}$ Torr. Further, a chamber baking is carried out to release residual gases from the chamber in which the sputtering is carried out.

Next, the upper insulator layer 116 (not shown) made of $SiO_2$ having a thickness of 1200 angstrom (Å) is formed on the base 102 by sputtering. During the sputtering operation, the temperature of the base 102 is maintained at 200° C. Further, the upper shield layer 118 (not shown) is formed on the upper insulator layer 116. The upper shield layer 118 is a thin film made of NiFe (80 wt% Ni–20 wt% Fe) having the thickness of 1 μm. The upper shield layer 118 is formed to a predetermined shape by a photo lithography technique, for example, an ion milling method.

Further, a plurality of through-holes are formed on the upper insulator layer 116 by a photo lithography technique, for example, an ion milling method. Further, a lamination layer (not shown) consisting an Au film and a Cu film are formed by sputtering. The lamination layer has a thickness of about 1 μm. After forming the lamination layer, an etching is carried out to form a terminal part having a predetermined form. Further, after forming a photo-resist layer on the terminal part, a protect layer (not shown), which is made of $Al_2O_3$, is formed on the terminal part, the upper insulator layer 116 and the upper shield layer 118. The protect layer has a thickness of 5 μm. After forming the protect layer, the photoresist layer is removed by an organic solvent. Therefore, the part of the lamination layer associated with the through-hole, namely the terminal part, is exposed (a lift-off method.) Thus, the process for making the MR head of the first embodiment of the present invention is completed.

Table 1 shows results of measurements of the grain size and the specific resistance of an Mo layer under various degrees of vacuum.

TABLE 1

| Degree of vacuum (Torr) | Grain size (angstrom (Å)) | Specific resistance (μΩcm) |
| --- | --- | --- |
| $4 \times 10^{-5}$ | 10 | 200 |
| $2 \times 10^{-6}$ | 100 | 80 |
| $7 \times 10^{-7}$ | 170 | 20 |

The thickness of the Mo layer is 100 angstrom (Å). Table 1 shows that the higher the degree of vacuum, the greater the grain size of the Mo layer and the smaller the specific resistance becomes. As a result, it is preferable to form a Mo layer under lower pressure to provide larger grain size in the Mo layer.

Figure 6:
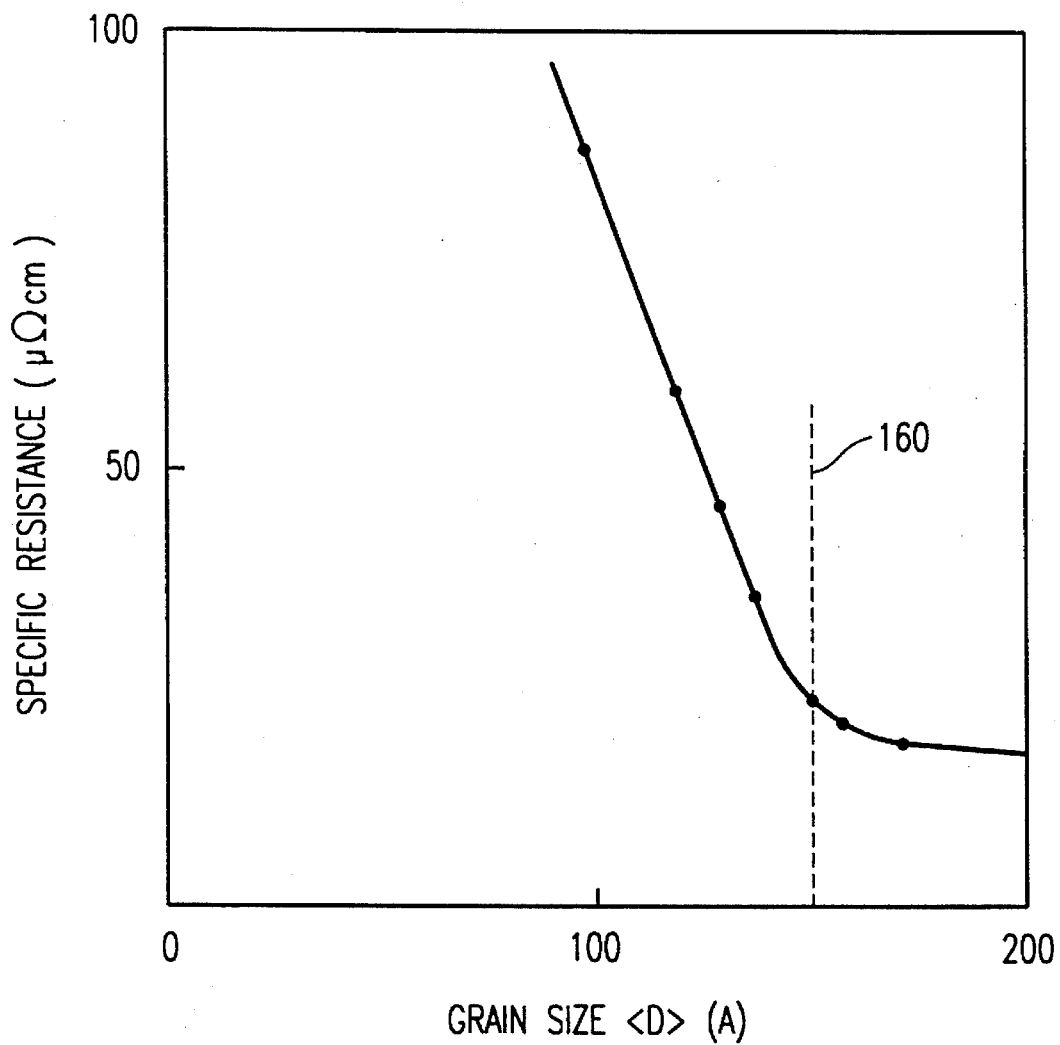
FIG. 6 is a graph view showing the relation between the grain size of an Mo shunt layer and the specific resistance of the shunt layer.

FIG. 6 shows the relation between the grain size and the specific resistance of the Mo layer. The Mo layer has a thickness of 100 angstrom (Å). As shown in FIG. 6, if the grain size of the Mo layer is over about 150 angstrom (Å) (A vertical dotted line 160 designates the grain size of 150 angstrom.), the specific resistance is about 20 μΩcm and does not change. On the other hand, in the region in which the grain size is under 150 angstrom (Å), the specific resistance increases steeply with decreases in the grain size.

Figure 7:
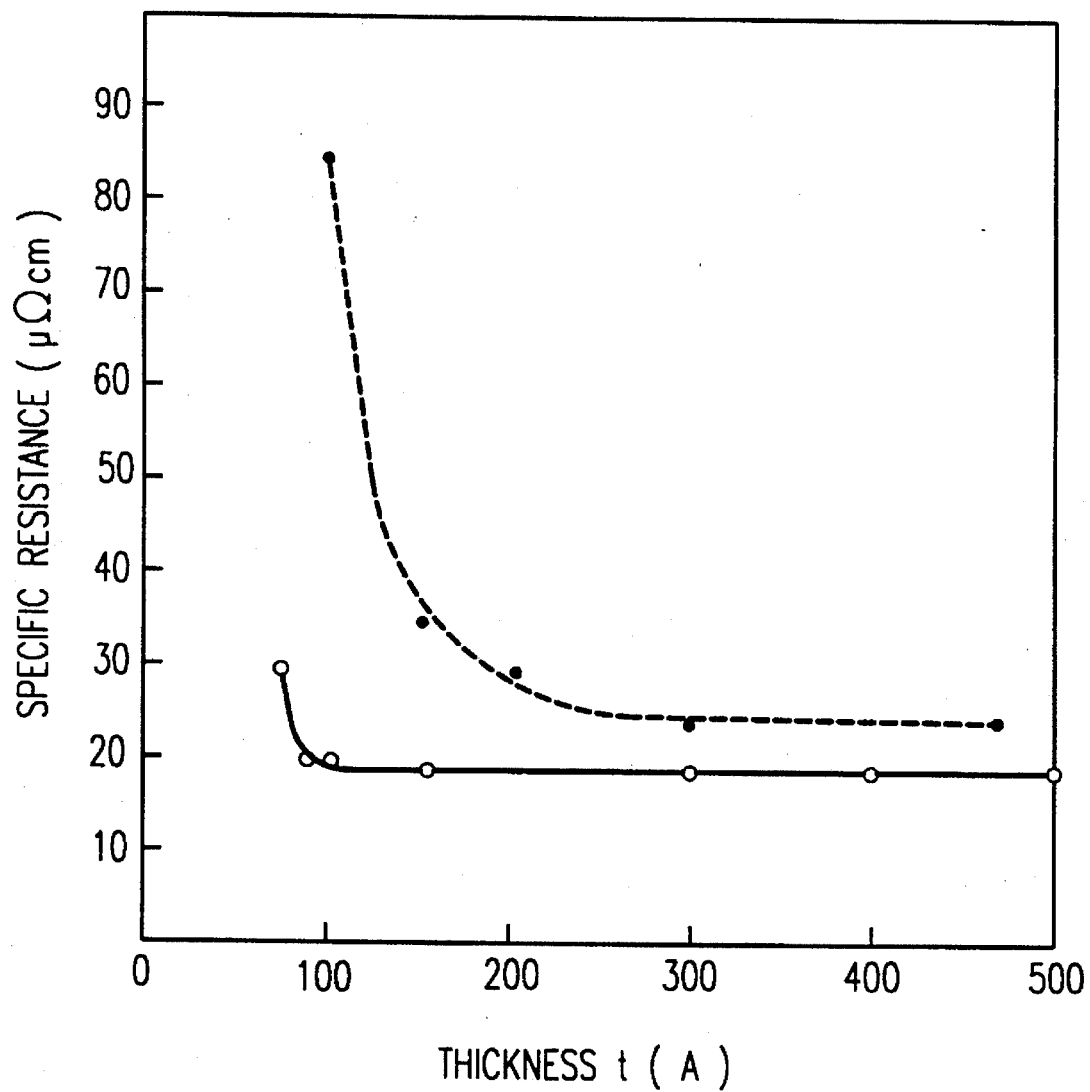
FIG. 7 is a graph view showing relations between the thickness of an Mo shunt layer and the specific resistance of the shunt layer.

FIG. 7 shows the relation between the thickness and specific resistance of two Mo layers having different grain sizes, 100 angstrom (Å)(dotted line) and 170 angstrom (Å) (solid line). The Mo layers having various thicknesses are formed on a glass plate, and specific resistance thereof were measured. According to FIG. 7, in the case of the Mo layer having a grain size of 100 angstrom (Å), the specific resistance rapidly increases under 150 angstrom thickness. On the other hand, the specific resistance remains about 25 μΩcm, even as the thickness of the Mo layer is approximately 500 angstrom. In a case of Mo layer having the grain size of 170 angstrom, if the thickness is over about 90 angstrom, the specific resistance remains at a substantially constant vale (about 20 μΩcm).

According to a corrosion resistance test executed by the inventors, an Mo layer having a grain size of 170 angstrom has a strength of corrosion resistance about twice as large as that of an Mo layer having a grain size of 100 angstrom. Namely, the corrosion speed of the Mo layer, having a grain size of 100 angstrom, is 40 angstrom/hour(h). On the other hand, the corrosion speed of a Mo layer, having a grain size of 170 angstrom, is 20 angstrom/h. In this experiment, a test body of Mo layer was immersed in salt water, and the corrosion speed was measured.

Figure 8:
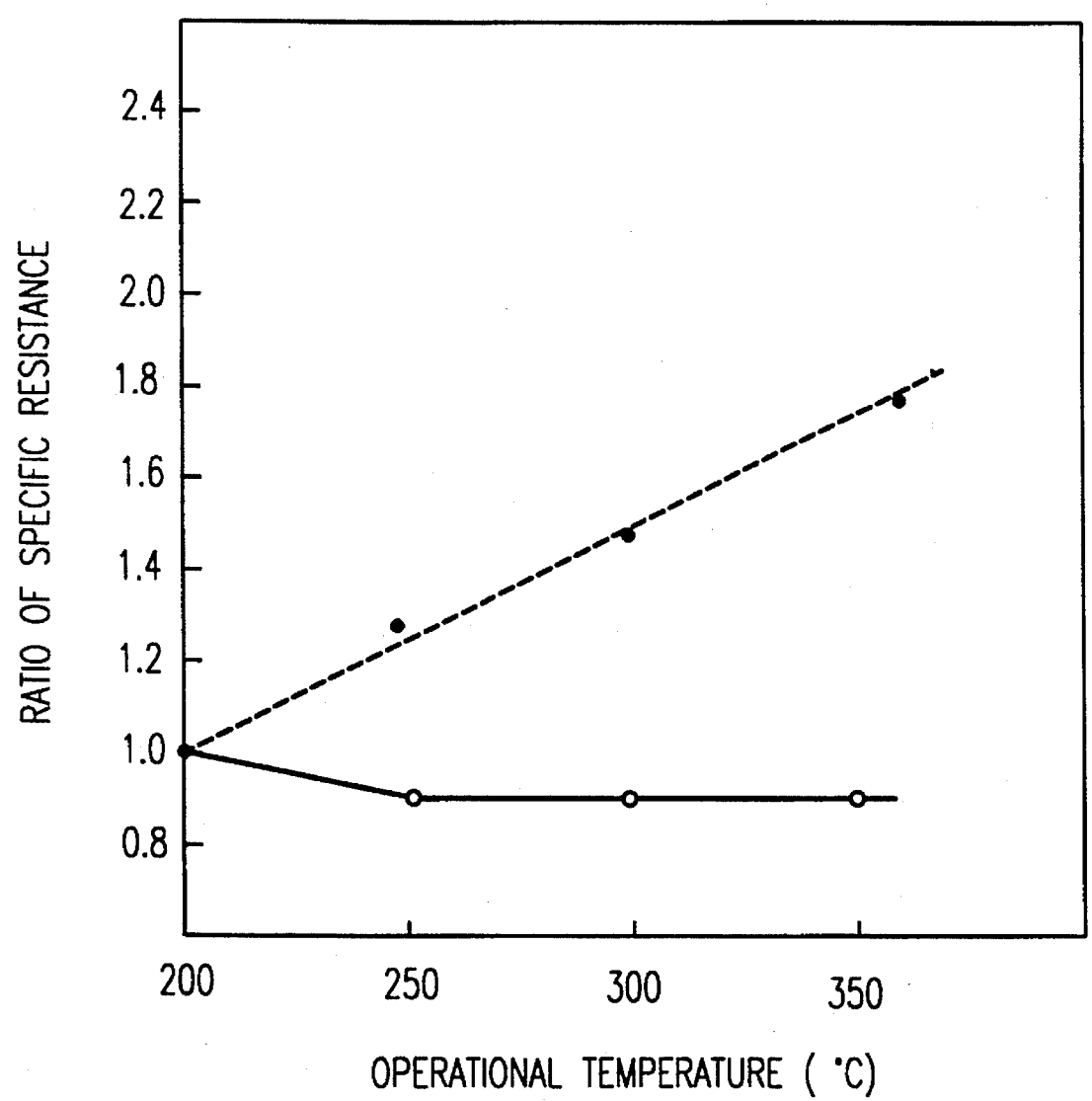
FIG. 8 is a graph view showing relations between the temperature of one manufacturing process and the specific resistance of a shunt layer after the manufacturing process.

FIG. 8 shows the relation between the process temperature and the specific resistance. In the experiment, the Mo layer having a grain size of 170 angstrom and an Nb layer are respectively formed on different crystallized glass plates. The variation in the specific resistance caused by different heating processes was measured for two test bodies. The vertical axis in FIG. 8 represents the ratio between the specific resistance after the heating process and the specific resistance before the heating process. The transverse axis represents the temperature of the heating process (a heating temperature). As shown in FIG. 8, in the case of the Nb layer(dotted line), the ratio of specific resistance after and before the heating process increases in proportion to the increase in the heating temperature. In contrast, in the case of the Mo layer (solid line), the ratio of the specific resistance decreases after the heating process. This result shows that Mo is superior in heat-proof characteristics.

Figure 9:
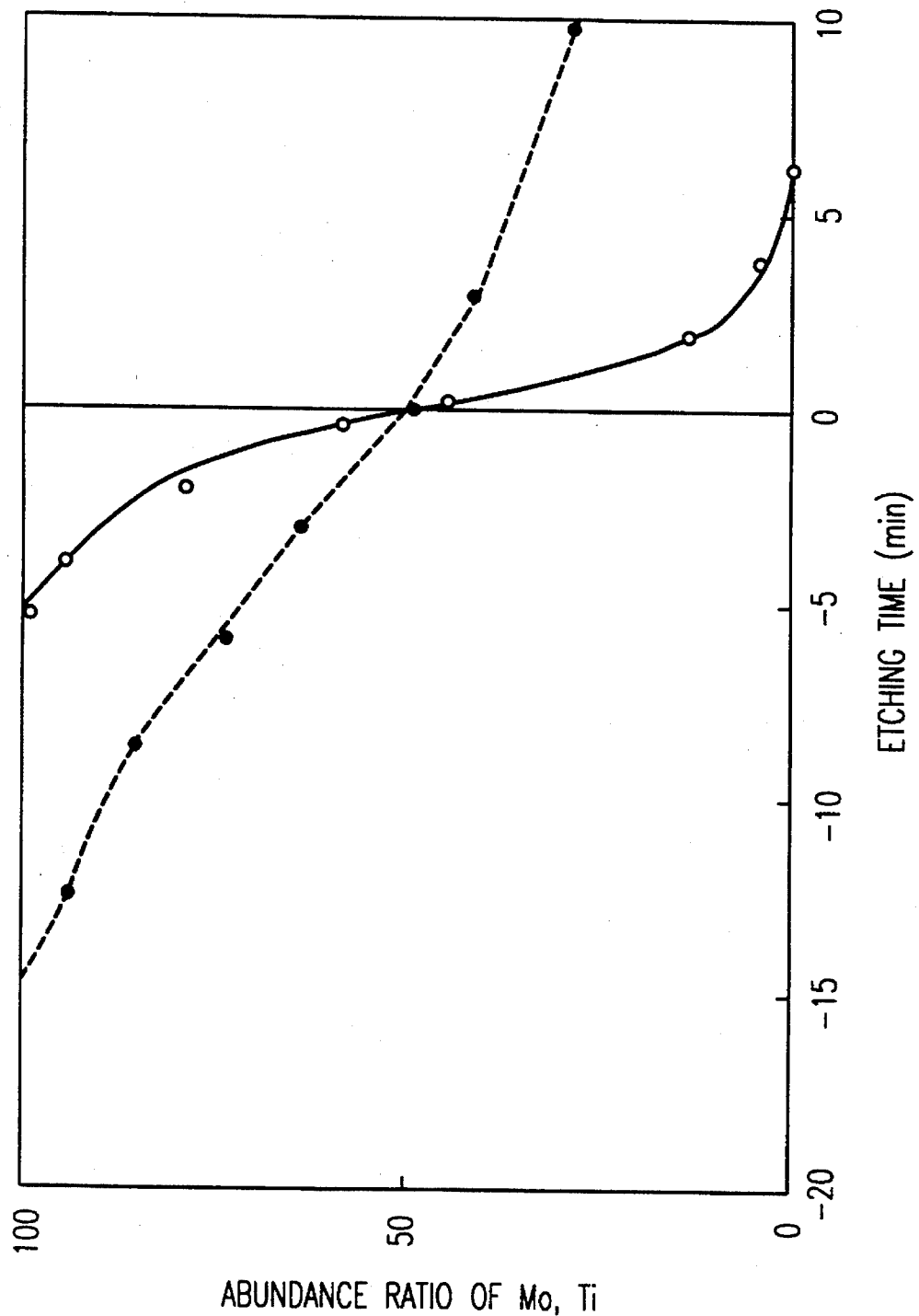
FIG. 9 is a graph view showing diffusion status between an MR layer and a shunt layer.

FIG. 9 shows the results of an experiment concerning diffusion status between an NiFe layer and a Mo/Ti layer. In the experiment, a first test body was prepared by forming a NiFe layer on a crystallized glass plate, and then forming a Mo layer on the NiFe layer. The Mo layer is composed of Mo grains having a grain size of 170 angstrom. A second test body has a Ti layer instead of the Mo layer. The first and the second test body were etched to investigate the boundary status at the boundary between the NiFe layer and Mo/Ti. Assuming the existence ratio of materials is measured at a specific etching time, the etching time is proportional to the distance from a surface of each test body. The solid line shows the case of the Mo layer. The dotted line shows the case of the Ti layer. The vertical axis represents abundance ratio of Mo or Ti (atomic percent (at%)). The horizontal axis presents etching time (in minutes).

Further, in FIG. 9, the point at which each existence ratio of Mo or Ti is 50% is a standard point on the horizontal axis (0 min). Therefore, the numbers on the horizontal axis do not represent the real etching time, but rather the relative etching time. Further, as there is a difference in the etching speed between the first and the second test bodies, normalization of the etching time has been made to correctly compare the first and the second test bodies in FIG. 9.

In FIG. 9, the inclination of dotted line is a steep slope. On the other hand, the slope of the solid line shows a sharp change. This means that the diffusion of the Mo is smaller than that of the Ti. As a result, the NiFe layer is less affected by the Mo layer than by the Ti layer.

Figure 10:
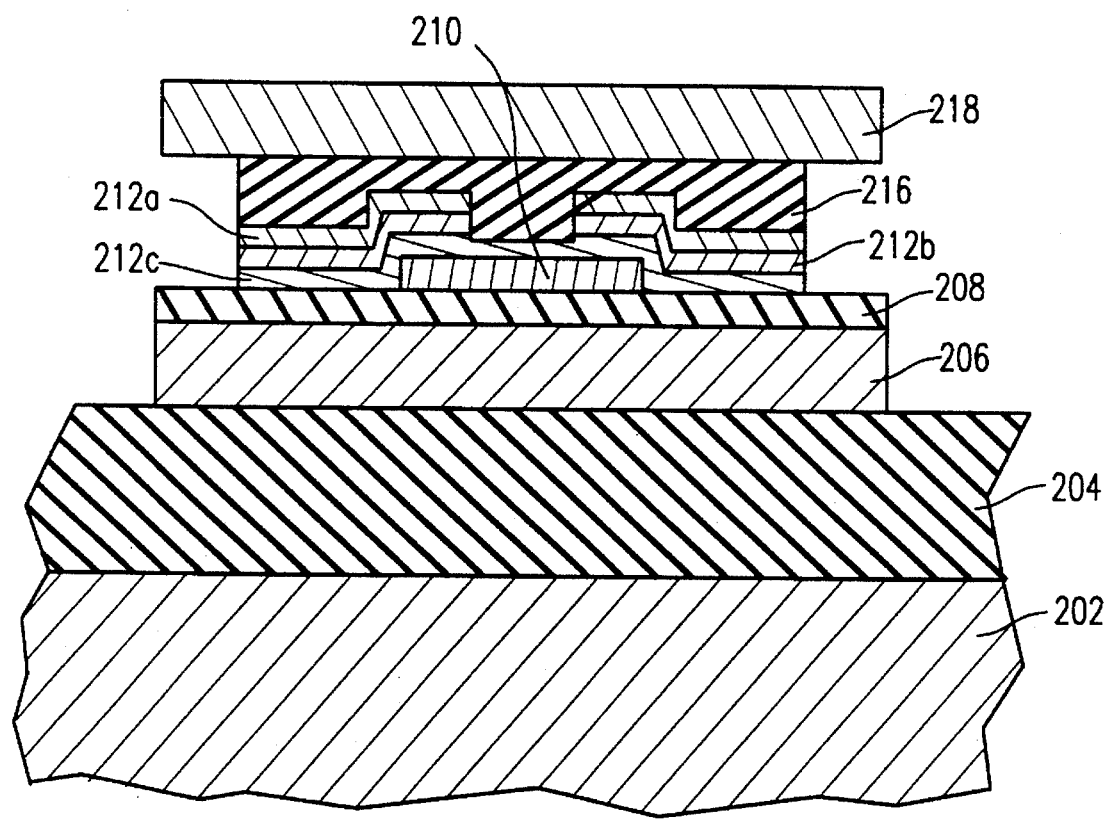
FIG. 10 is a cross section view showing a second embodiment of the present invention.

FIGS. 10 to 13 show other embodiments of the present invention. FIG. 10 shows a second embodiment of the present invention. In the second embodiment, there is a base 202 illustratively made of $Al_2O_3$—TiC. An insulation layer 204 illustratively made of $Al_2O_3$ is formed on the base 202. A lower shield layer 206 made of, for example, NiFe is formed on the insulation layer 204. Further, a lower insulation layer 208 is formed on the lower shield layer 206. An MR layer 210 made of NiFe is formed on the about center of the lower insulation layer 208. An electrode layer 212 is formed on the MR layer 210 and the lower insulation layer 208. The electrode layer 212 is composed by three layers of Molybdenum 212a(Mo), Gold 212b(Au) and Mo 212c. An upper insulation layer 216 is formed on the electrode layer 212. An upper shield layer 218 formed on the upper insulation layer 216. Further, the upper two layers (Mo/Au) 212a and 212b of the electrode layer 212 are etched to a predetermined shape by the etching method. The lowest Mo layer 212c of the electrode layer 212 is formed to a predetermined shape for a shunt layer. Therefore, the lowest Mo layer 212c becomes the shunt layer.

Figure 11:
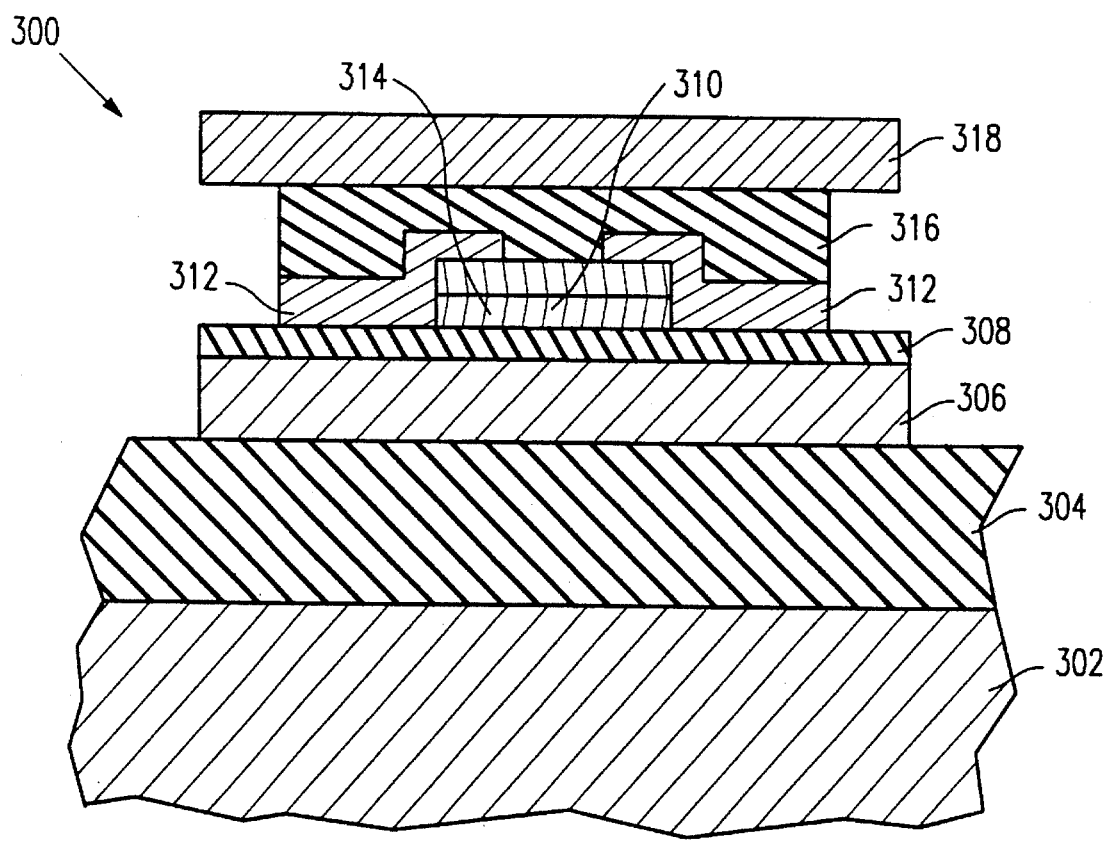
FIG. 11 is a cross section view showing a third embodiment of the present invention.

FIG. 11 shows a third embodiment of the present invention. In the third embodiment, there is a base 302 illustratively made of $Al_2O_3$—TiC. An insulation layer 304 illustratively made of $Al_2O_3$ is formed on the base 302. A lower shield layer 306 made of, for example, NiFe is formed on the insulation layer 304. A lower insulation layer 308 is formed on the lower shield layer 306. An MR layer 310 made of NiFe is formed on the lower insulation layer 308. A shunt layer 314 made of Mo is formed on the MR layer 310. An electrode layers 312 that are composed by three layers of Molybdenum (Mo), Gold (Au) and Mo are formed on the lower insulation layer 308 and the shunt layer 314. Further, an upper insulation layer 316 is formed on the electrode layer 312. An upper shield layer 318 is formed on the upper insulation layer 316. Therefore, the shunt layer 314 directly formed on the MR layer 310.

Figure 12:
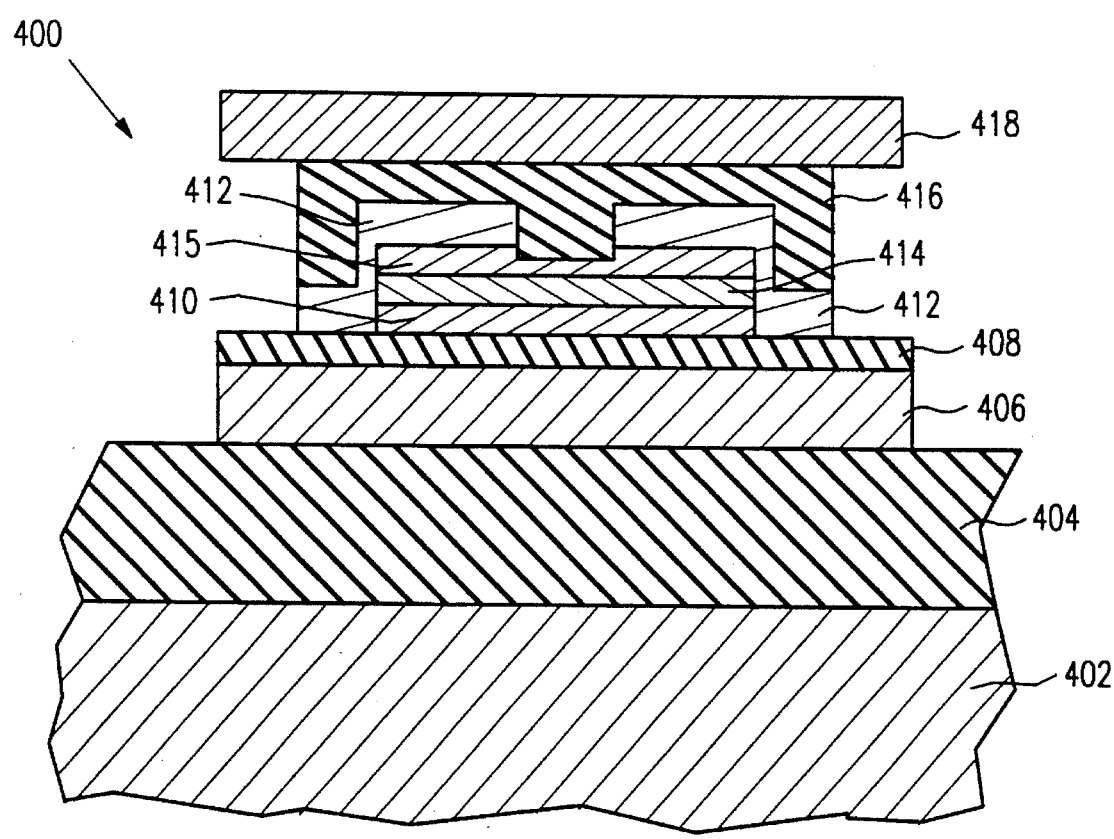
FIG. 12 is a cross section view showing a fourth embodiment of the present invention.

FIG. 12 shows a fourth embodiment of the present invention. In the fourth embodiment, There is a base 402 illustratively made of $Al_2O_3$—TiC. An insulation layer 404 illustratively made of $Al_2O_3$ is formed on the base 402. A lower shield layer 406 made of, for example, NiFe is formed on the insulation layer 404. Further, a lower insulation layer 408 is formed on the lower shield layer 406. An MR layer 410 made of NiFe is formed on the lower insulation layer 408. A shunt layer 414 made of Mo is directly formed on the MR layer 410 and a protect layer 415 is formed on the shunt layer 414. An electrode layers 412 are formed on the protect layer 415 and the lower insulation layer 408. The electrode layers 412 are composed by three layers of Molybdenum (Mo), Gold (Au) and Mo. An upper insulation layer 416 is formed on the electrode layers 412 and the protect layer 415. An upper shield layer 418 is formed on the upper insulation layer 416. The protect layer 415 is illustratively made of Ti and has a thickness of about 100 angstrom. The electrode layer 412 is etched to a predetermined shape by the etching method. Even in this etching process, the shunt layer 414 is not affected because of the presence of the protect layer 415. As a result, the resistance of the shunt layer does not change. This is important for the MR head, because changes in the resistance of the shunt layer 414 affect the strength of the bias magnetic field, further as well as the output characteristics of the MR head.

The specific resistance of the protect layer 415 in this embodiment is approximately 100 µΩcm. Further, the protect layer 415 has substantially the same thickness, width and length as those of the shunt layer 414. Therefore, the resistance of the protect layer is substantially larger than that of the shunt layer 414. As a result, an electric current through the protect layer 415 is very small. Consequently, the strength of the magnetic bias field made by the shunt layer 414 is about the same as that of the MR head which does not have a protect layer covering the shunt layer 414.

Instead of Ti, it is preferable that an alloy which contains from 0 to 40 at% of other metal (for example, Nb, Cr, W, Mo, Ta, Zr or Hf) with Ti is used as the protect layer 415. Since the specific resistance of this alloy is more than 100 µΩcm, the protect layer 415 makes no effect or little effect to the electric current through the shunt layer 414 and the strength of the magnetic bias field made by the shunt layer 414.

Further, it is preferable to use a part of the electrode layer 412 as the protect layer. For example, in the electrode layer 412 having three layer structure of Ti/Au/Ti or Mo/Au/Ti, the lowest Ti layer is used as the protect layer.

Figure 13:
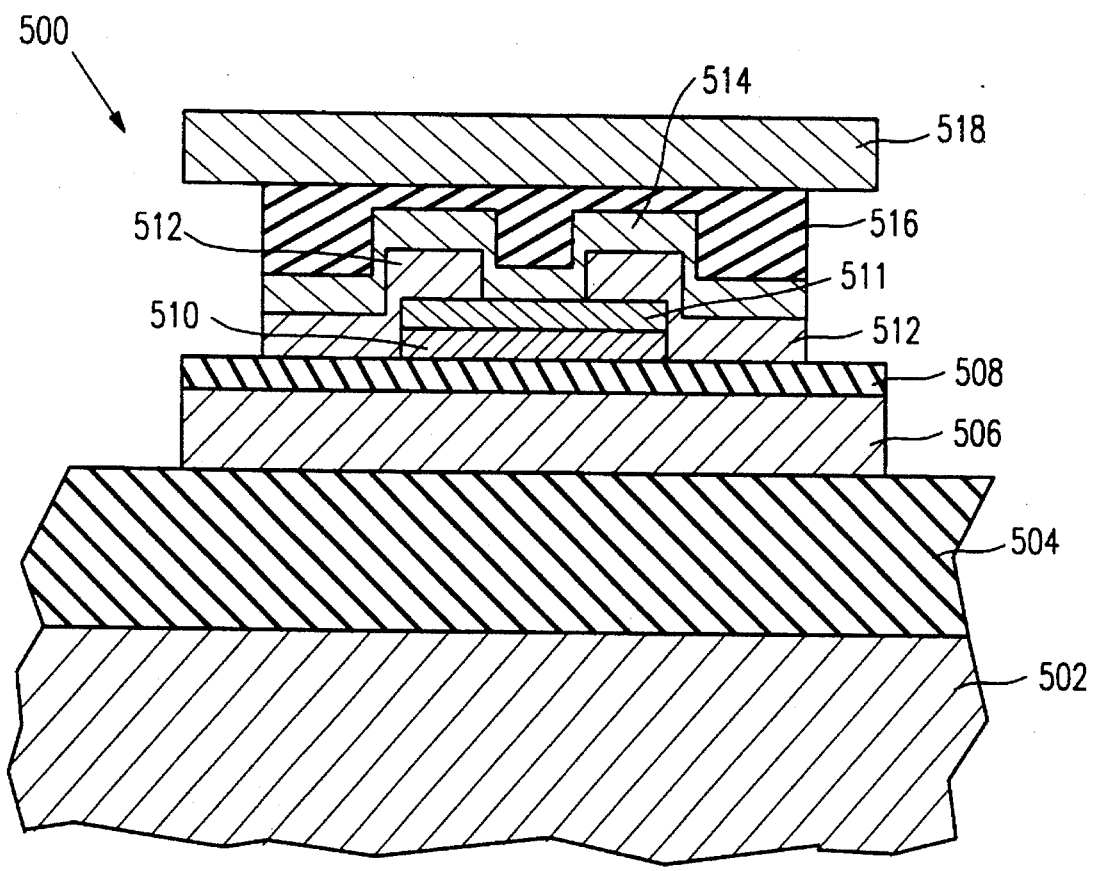
FIG. 13 is a cross section view showing a fifth embodiment of the present invention.

FIG. 13 shows a fifth embodiment of the present invention. There is a base 502 illustratively made of $Al_2O_3$—TiC. An insulation layer 504 illustratively made of $Al_2O_3$ is formed on the base 502. A lower shield layer 506 made of, for example, NiFe is formed on the insulation layer 504. A lower insulation layer 508 is formed on the lower shield layer 506. An MR layer 510 made of NiFe is formed on the lower insulation layer 508. An antiferromagnetism layer 511 is formed on the MR layer 510. Further, an electrode layers 512 are formed on the antiferromagnetism layer 511 and the lower insulation layer 508. the electrode layers 512 are composed by three layers of Molybdenum (Mo), Gold (Au) and Mo. A shunt layer 514 made of Mo is formed on the electrode layers 512. An upper insulation layer 516 is formed on the shunt layer 514. An upper shield layer 518 is formed on the upper insulation layer 516.

The antiferromagnetism layer 511 is illustratively made of FeMn. The antiferromagnetism layer 511 is used for controlling the magnetic domain of the MR layer 510. The antiferromagnetism layer 511 has a thickness of about 200 angstrom. The electrode layer 512 and the shunt layer 514 are formed on the antiferromagnetism layer 511 in a similar manner the first embodiment is formed. Between the MR layer 510 and the antiferromagnetic layer 511, there is no diffusion effect. Therefore, the defect of MR characteristics of the MR layer caused by the diffusion of Mo is effectively prevented. It is also preferable to have an antiferromagnetic layer formed on the MR layer in the first embodiment to the forth embodiment.

What is claimed is:

1. A magneto-resistance type magnetic head comprising;
   an upper shield layer;
   a lower shield layer spaced a distance from the upper shield layer;
   a magneto-resistance effect device disposed over the lower shield layer;
   a shunt layer disposed adjacent to the magneto-resistance effect device and providing a magnetic bias field to the magneto-resistance effect device in response to an electric current; and
   an electrode layer in contact with the magneto-resistance effect device and the shunt layer for providing an electric current to both the magneto-resistance effect device and the shunt layer,
   the magneto-resistance effect device, the shunt layer and the electrode layer being disposed between the upper shield and the lower shield, and the shunt layer consisting of molybdenum, the molybdenum having grains wherein an average size of the grain along a direction in a plane of the shunt layer being more than 150 angstrom.

2. A magneto-resistance type magnetic head as defined in claim 1, wherein a protect layer is disposed adjacent to the shunt layer, the protect layer consisting of a metal material, the protect layer having a specific resistance greater than that of the shunt layer.

3. A magneto-resistance type magnetic head as defined in claim 2, wherein the protect layer consists of titanium.

4. A magneto-resistance type magnetic head as defined in claim 2, wherein the protect layer consists of an alloy including titanium and one selected from a group consisting of, Nb, Cr, W, Mo, Ta, Zr and Hf, the alloy including at least 60 atom percent of titanium.

5. A magneto-resistance type magnetic head as defined in claim 1, wherein the shunt layer has a thickness of about 100 angstrom and the magneto-resistance effect device has a thickness of about 300 angstrom.

6. A magneto-resistance type magnetic head as defined in claim 1, wherein the electrode layer is disposed between the magneto-resistance effect device and the shunt layer.

7. A magneto-resistance type magnetic head as defined in claim 1, wherein the shunt layer is disposed between the magneto-resistance effect device and the electrode layer.

8. A magneto-resistance type magnetic head as defined in claim 1, wherein the magneto-resistance effect device is covered by an antiferromagnetic substance layer.

9. A magneto-resistance type magnetic head as defined in claim 8, wherein the antiferromagnetic substance layer is made of FeMn.

10. A magneto-resistance type magnetic head as defined in claim 1, wherein the electrode layer is disposed between the magneto-resistance effect device and the shunt layer, and the shunt layer is directly in contact with the magneto-resistance effect device on the center part of the magneto-resistance type magnetic head.

11. A magneto-resistance type magnetic head as defined in claim 1, wherein the shunt layer has a thickness of about 100 angstrom and the grain size is about 150 angstrom.

12. A magneto-resistance type magnetic head as defined in claim 1, wherein the shunt layer has a thickness of about 100 angstrom and the grain size is about 170 angstrom.

13. A magneto-resistance type magnetic head as defined in claim 1, wherein the magnetic bias field is essentially provided by the shunt layer.

14. A magneto-resistance type magnetic head as defined in claim 1, wherein the magnetic bias field is solely provided by the shunt layer.

15. A magneto-resistance type magnetic head comprising:
    an upper shield layer;
    a lower shield layer spaced a distance from the upper shield layer;
    a magneto-resistance effect device disposed over the lower shield layer;
    a shunt layer disposed adjacent to the magneto-resistance effect device and providing a magnetic bias field to the magneto-resistance effect device in response to an electric current, wherein the shunt layer has a thickness that is less than 150 angstroms; and
    an electrode layer in contact with the magneto-resistance effect device and the shunt layer for providing an electric current to both the magneto-resistance effect device and the shunt layer,
    the magneto-resistance effect device, the shunt layer and the electrode layer being disposed between the upper shield and the lower shield, the shunt layer consisting of molybdenum having a predetermined grain size along a direction in a plane of the shunt layer, wherein the predetermined grain size is determined from a characteristic curve between a specific resistance and the grain size of the shunt layer where the curve is substantially flat.

16. A magneto-resistance type magnetic head as defined in claim 15, wherein the grain size is more than 170 angstrom.

17. A magneto-resistance type magnetic head as defined in claim 15, wherein the magnetic bias field is essentially provided by the shunt layer.

18. A magneto-resistance type magnetic head as defined in claim 15, wherein the magnetic bias field is solely provided by the shunt layer.

* * * * *